(12) United States Patent  (10) Patent No.: US 8,146,997 B2
Sobieski et al.  (45) Date of Patent: Apr. 3, 2012

(54) SEAT ASSEMBLY HAVING A MOVABLE HEAD RESTRAINT

(75) Inventors: Zdzislaw Sobieski, Eching (DE); Ralph Fey, Zirndorf (DE); Karsten Mueller, Ingolstadt (DE)

(73) Assignee: Lear Corporation, Southfield, MI (US)

(*) Notice: Subject to any disclaimer, the term of this patent is extended or adjusted under 35 U.S.C. 154(b) by 153 days.

(21) Appl. No.: 12/761,091

(22) Filed: Apr. 15, 2010

(65) Prior Publication Data

US 2010/0270841 A1 Oct. 28, 2010

Related U.S. Application Data (60) Provisional application No. 61/171,568, filed on Apr. 22, 2009, provisional application No. 61/300,228, filed on Feb. 1, 2010.

(30) Foreign Application Priority Data

Mar. 26, 2010 (DE) .......................... 10 2010 003 349

(51) Int. Cl.
*B60N 2/48* (2006.01)
(52) U.S. Cl. ........................................ 297/404; 297/391
(58) Field of Classification Search .................. 297/404, 297/391
See application file for complete search history.

(56) References Cited

U.S. PATENT DOCUMENTS

| 4,265,482 A | 5/1981 | Nishimura et al. |
| 4,278,291 A * | 7/1981 | Asai ............................... 297/391 |
| 4,640,549 A * | 2/1987 | Yokota ........................... 297/410 |
| 4,674,797 A | 6/1987 | Tateyama |
| 6,983,995 B1 | 1/2006 | Veine et al. |
| 7,073,863 B1 | 7/2006 | Low et al. |
| 7,144,083 B2 | 12/2006 | List et al. |
| 7,316,455 B2 | 1/2008 | Metz et al. |
| 7,677,658 B2 * | 3/2010 | Choi .......................... 297/404 X |
| 7,871,129 B2 * | 1/2011 | Boes et al. ..................... 297/404 |
| 2001/0028191 A1 | 10/2001 | Lance |
| 2006/0250017 A1 | 11/2006 | Otto et al. |
| 2008/0001456 A1 | 1/2008 | Muller et al. |
| 2009/0058162 A1 | 3/2009 | Boes et al. |
| 2009/0146479 A1 | 6/2009 | Boes et al. |

FOREIGN PATENT DOCUMENTS

| DE | 10035972 A1 | 2/2001 |
| DE | 102004055986 A1 | 6/2006 |
| DE | 102005020276 B3 | 9/2006 |
| EP | 1717099 A2 | 11/2006 |
| WO | 2004089688 A1 | 10/2004 |
| WO | 2007073034 A1 | 6/2007 |

* cited by examiner

*Primary Examiner* — Rodney B White
(74) *Attorney, Agent, or Firm* — Brooks Kushman P.C.

(57) ABSTRACT

A vehicle head restraint assembly is provided with a first guide member mounted proximate to a vehicle seat back and a second guide member mounted to the first guide member for movement in fore and aft direction. One of the guide members has a series of notches. A head restraint is mounted to the second guide member. A locking mechanism is mounted to the other guide member for extending into one of the notches. A biasing member biases the locking mechanism in engagement with the notches. An actuator is mounted to one of the guide members for actuation from one lateral side of the head restraint and cooperates with the locking mechanism such that linear actuation of the actuator from one lateral side results in symmetrical compression of the biasing member for disengaging the locking mechanism from the notches for permitting fore and aft adjustment of the head restraint.

20 Claims, 11 Drawing Sheets

SEAT ASSEMBLY HAVING A MOVABLE HEAD RESTRAINT

CROSS-REFERENCE TO RELATED APPLICATIONS

This application claims the benefit of U.S. provisional application Ser. No. 61/171,568, filed Apr. 22, 2009, and U.S. provisional application Ser. No. 61/300,228, filed Feb. 1, 2010. This application also claims foreign priority benefits under 35 U.S.C. §119(a)-(d) to DE 10 2010 003 349.9, filed Mar. 26, 2010, the disclosures of which are incorporated by reference in their entirety.

BACKGROUND

1. Technical Field

Various embodiments relate to a vehicle seat assembly having a movable head restraint.

2. Background Art

Movable head restraints permit adjustment of a head restraint relative to the seat assembly. One such example is disclosed in U.S. Pat. No. 7,073,863 B1 to Low et al.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Figure 1:
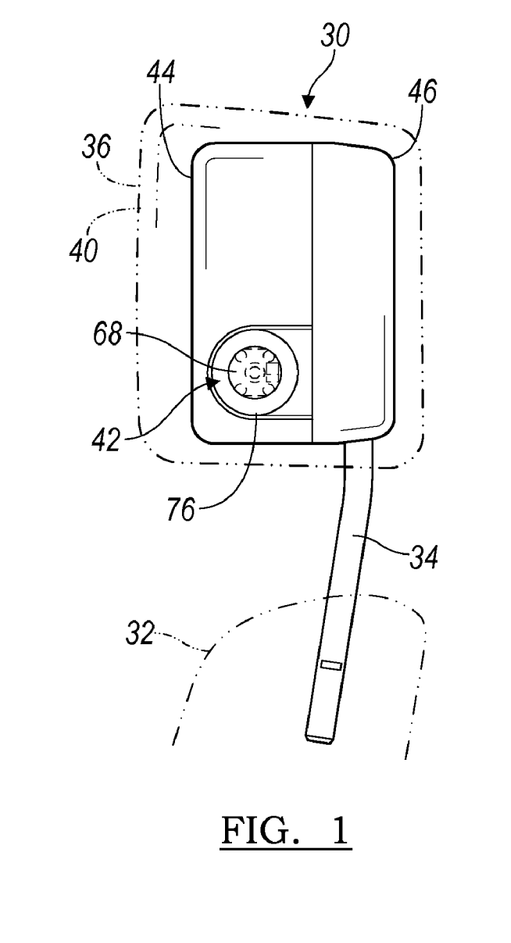
FIG. 1 is a side elevation view of a movable head restraint assembly according to at least one embodiment, illustrated in a forward position.

Referring to FIG. 1, a movable head restraint assembly 30 is shown. The head restraint assembly 30 may be provided with a seat assembly, as illustrated by a seat back 32 in FIG. 1. The seat assembly may be a seat for a vehicle, such as a vehicle like a car or truck.

The movable head restraint assembly 30 may include a support post 34 and a headrest 36.

The support post 34 may extend from the seat back 32 of the vehicle seat. The support post 34 may be fixedly or movably disposed on the seat back 32 in various embodiments. The support post 34 may be disposed in a guide sleeve that is disposed on the seat back 32. The support post 34 may have any suitable configuration. For example, one or more support posts 34 may extend between the seat back 32 and the headrest 36. Moreover, the support post 34 may be generally U-shaped. The support post 34 may be made of any suitable material or materials such as a metal or metal alloy. The support post 34 may also be mounted directly to the vehicle body proximate to the vehicle seat back 32.

The headrest 36 may include a trim cover 38 (FIG. 4), a cushion 40 and a positioning apparatus 42. The headrest 36 may be configured to support the head of a seat occupant and move in one or more directions with respect to the support posts 34.

The trim cover 38 may provide at least a portion of the exterior of the headrest 36. The trim cover 38 may be made of any suitable material or materials, such as vinyl, leather, fabric, or combinations thereof.

The cushion 40 may be disposed proximate and may be concealed by the trim cover. The cushion 40 may be made of any suitable material or materials. For example, the cushion 40 may be an opened or closed cell foam.

Figure 2:
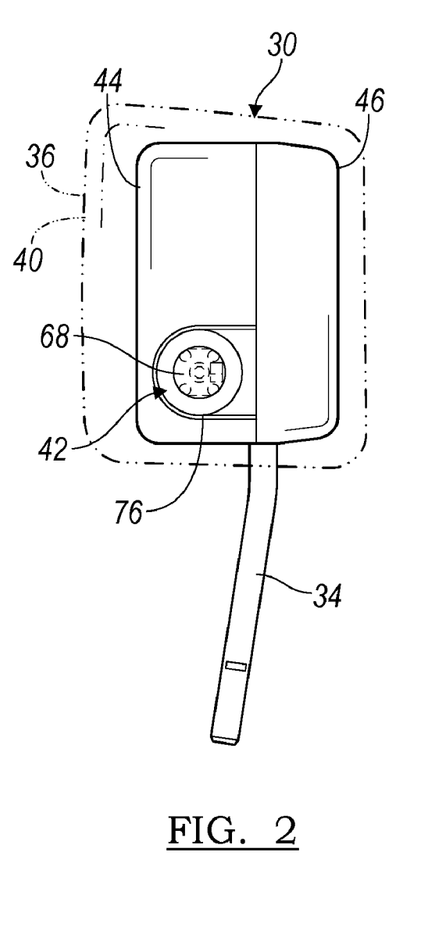
FIG. 2 is another side elevation view of the head restraint assembly of FIG. 1, illustrated in an intermediate position.
Figure 3:
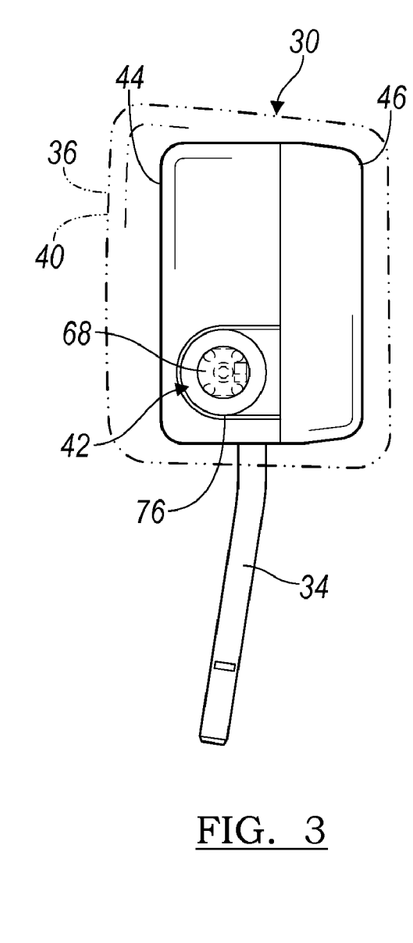
FIG. 3 is another side elevation view of the head restraint assembly of FIG. 1, illustrated in a rearward position.

The positioning apparatus 42 may facilitate movement of the headrest 36. For example, the positioning apparatus 42 may be utilized for positioning the headrest 36 in a range of positions illustrated in FIGS. 1-3, wherein FIG. 1 illustrates a forward-most position; FIG. 2 illustrates an intermediate position; and FIG. 3 illustrates a rearward-most position.

Figure 4:
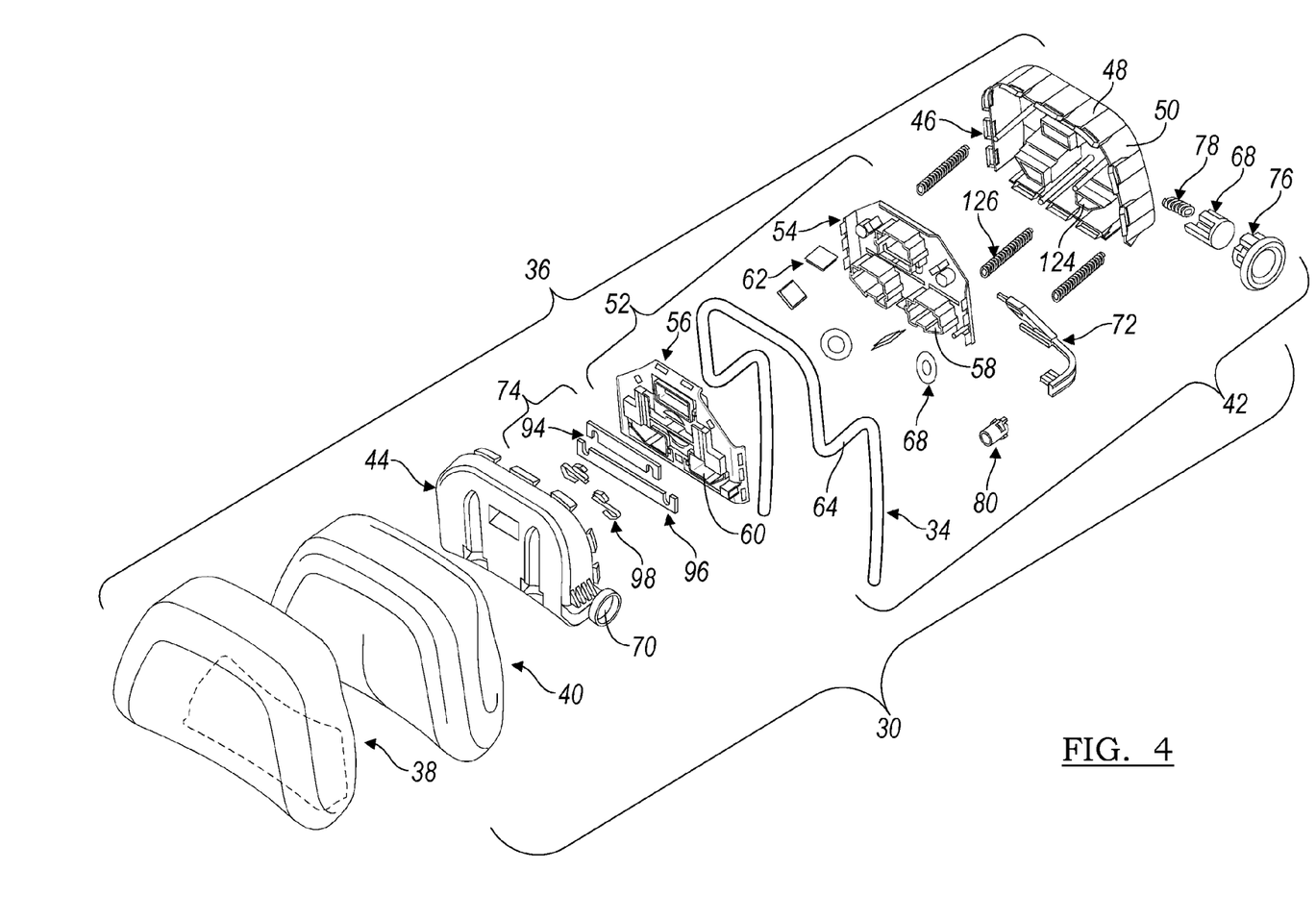
FIG. 4 is an exploded perspective view of the head restraint assembly of FIG. 1.

Referring to FIG. 4, the headrest 36 may also include a front shell 44 and a back shell 46. The front and back shells 44, 46 may be disposed at least partially inside the trim cover 38 and or foam 40. The front and back shells 44, 46 may provide a support structure and may include openings that face toward each other. The front and back shells 44, 46 may engage or interlock with each other. The back shell 46 may include one or more posts 48 that extend toward and may engage corresponding posts 49 (FIGS. 8 and 9) of the front shell 44. The front shell 44 may be similarly configured.

For the depicted embodiment, the back shell 46 includes an array of posts 48 with an upper central post 48 and a pair of lower laterally spaced posts 48. Each of the posts 48 may have any suitable guide configuration. For the depicted embodiment, the upper post 48 is generally rectangular; and the lower posts 48 each include a bevel removing an outboard corner of the otherwise rectangular profile to facilitate with guidance and assembly of a corresponding guide member. Additionally, each of the posts includes a series of notches 50 formed therein spaced incrementally in an axial direction of the posts 48. The posts 49 of the front shell 44 are similarly configured and may include a series of notches 51.

A traverse member 52 may be disposed on the seat back 32. The traverse member 52 may be at least partially disposed in the headrest 36 and/or front and back shells 44, 46.

The traverse member 52 also includes a traverse rear shell 54 and a traverse front shell 56 for mounting upon the support post 34 and for retaining components of the positioning apparatus 42. The traverse rear and front shells 54, 56 may be configured to be assembled together. Each of the traverse rear and front shells 54, 56 include an array of sleeves 58, 60 that are sized to receive the posts 48, 49 of the back shell 46 and the front shell 44, respectively. Each of the sleeves 58, 60 may include a plurality of bar guides each provided about the periphery for reducing friction resistance. Additionally, a plurality of slide members or sliders 62 may be provided each extending through a pair of sleeves 58, 60 of the traverse rear and front shells 54, 56 for providing uniform contact along the posts 48 of the back shell 46 and the posts 49 of the front shell 44. The sliders 62 may be formed of a material having a reduced coefficient of friction than that of the structural material, such as a polymeric material, that may be employed for the traverse rear and front shells 54, 56. In at least one embodiment, the sliders 62 may be fixedly disposed on or integrally formed with the traverse member 52. Alternatively, the sliders 62 may also be formed as sleeves and each may receive an associated post 48. Alternatively, the sliders 62 may be omitted in one or more embodiments. Additionally, the sliders 62 may operate as springs. In case of manual adjustment with one hand, a forward or rearward force may be applied to one lateral side of the headrest 36. The sliders 62 can build up back pressure to result in linear actuation without canting or binding.

The front shell 44 and the back shell 46 are mounted for movement in a fore and aft direction upon the traverse member 52. The front and rear shells 44, 46 support the cushion 40 and trim cover 38 of the headrest 36. The positioning apparatus 42 limits movement of the front and rear shells 44, 46, and consequently movement of the cushion 40 and the trim cover 38 relative to the traverse member 52 for permitting fore and aft adjustment of the headrest 36 relative to the post 34 and consequently the seat back 32.

The support post 34 may include a pair of intermediate fore and aft portions 64, which extend through the headrest 36. In one embodiment, a pair of rings 66 are mounted to the rear shell 46 and are utilized for mounting the trim cover 38 to the rear shell 46 while providing an opening in the trim cover 38 for the intermediate portions 64 of the support post 34 to extend through. In other embodiments, the rings 66 may not be necessary.

The positioning apparatus 42 is actuated by a manual button 68, which may be provided to facilitate locking or unlocking of the positioning apparatus 42. The button 68 may be received within a sleeve 70 of the front shell 44.

The button 68 may actuate a lever, such as a push rod 72. The push rod 72 may have any suitable configuration. The push rod 72 may be configured to move or actuate an interlocking member 74. In at least one embodiment, the push rod 72 may include an end feature that engages mating features on the interlocking member 74. The end feature may be generally triangular and may move in a first direction or manner. Movement of the end feature may cause the interlocking member 74 to move in a second direction or second manner. The first and second directions may be substantially perpendicular or may be along substantially perpendicular axes or planes. The push rod 72 may be spaced apart from or may be configured to move with respect to when one of the front and back shells 44, 46 is actuated.

A bevel ring 76 may be provided through an opening in the trim cover 38 and cushion 40 and mounted to the sleeve 70 of the front shell 44 for enclosing an opening through the trim cover 38 and the cushion 40 while permitting access to the button 68. A coil spring 78 may be provided between the button 68 and the bevel ring 76 for actuating the button 68 to a locked position of the interlocking member 74. Thus the user may be required to overcome a bias provided by the coil spring 78 when actuating the button 68 for consequently actuating the push rod 72 and the interlocking member 74.

Figure 5:
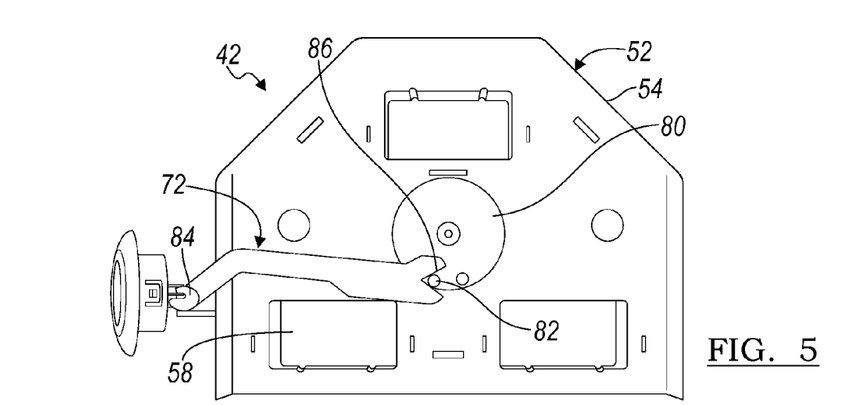
FIG. 5 is a rear side elevation of the head restraint assembly of FIG. 1, illustrated partially disassembled in a locked position.

FIG. 5 illustrates a rear side of the traverse rear shell 54. A rotary actuator 80 is pivotally connected to the traverse rear shell 54. The rotary actuator 80 includes an radially offset pin 82 extending therefrom for engagement with the push rod 72. The push rod 72 includes a first end 84 pivotally connected to the button 68. An output end of the push rod 72 includes a pair of inclined surfaces 86 that collectively provide a concaved surface 86 for receiving the pin 82. Therefore linear movement of the button 68 provides linear movement of the first end 84 of the push rod 72, which consequently causes the radially offset pin 82 to rotate about a center of the rotary actuator 80. Thus the push rod 72 is translated and pivoted at both ends as the rotary actuator 80 is rotated.

The push button 68 is mounted to the front shell 44 and translates with the front shell 44 relative to traverse member 52, and consequently the push rod 72. Therefore, the input end 84 of the push rod 72 extends in the fore and aft direction as illustrated in FIG. 4, for receiving an input force from the push button 68 at various positions of the push button 68.

Figure 6:
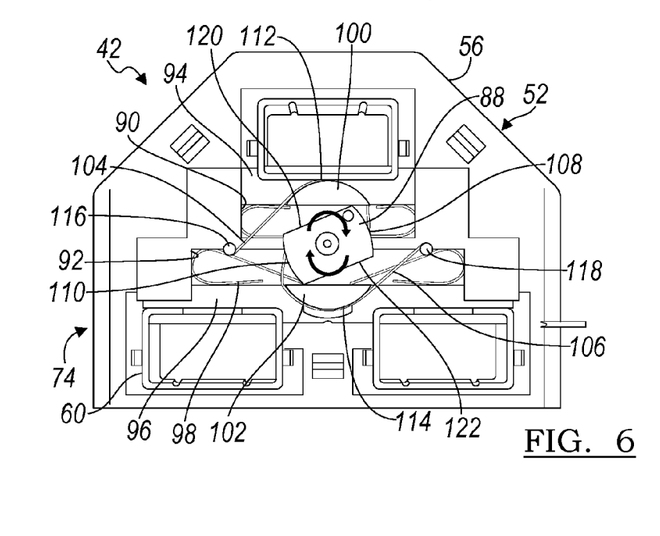
FIG. 6 is a front side elevation view of the head restraint assembly of FIG. 1, illustrated partially disassembled in the locked position.
Figure 7:
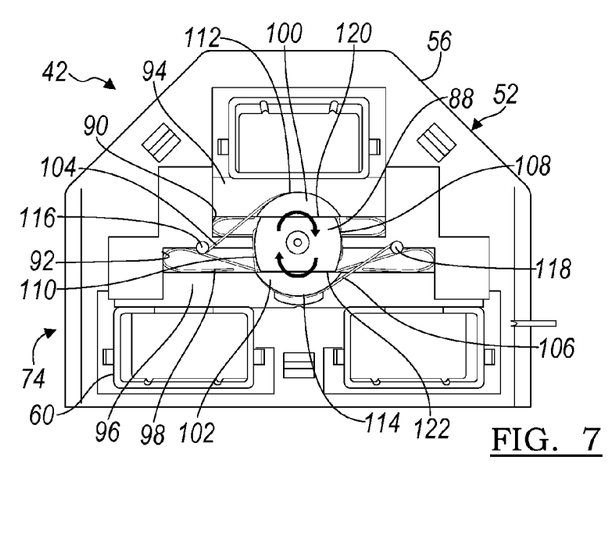
FIG. 7 is another front side elevation view of the head restraint assembly of FIG. 1, illustrated partially disassembled in an unlocked position.

FIGS. 6 and 7 illustrate a front surface of the traverse front shell 56. The rotary actuator 80 is connected for rotation with a cam 88. The interlocking part 74 may be received by the traverse member 52. The interlocking part 74 may be received in slots 90, 92 in the traverse member 52 and may be configured to move with respect to the traverse member 52. The interlocking member 74 may be configured to engage the front and/or back shells 44, 46 or one or more posts 48, 49 to permit movement of the front and rear shells 44, 46 and the headrest 36 with respect to the traverse member 52 and the support post 34. The interlocking member 74 may be configured to disengage the front and back shells 44, 46 or one or more posts 48, 49 to permit movement of the front and rear shells 44, 46 and the headrest 36 with respect to the traverse member 52 and the support post 34. The interlocking member 74 may have any suitable configuration. In at least one embodiment, the interlocking member 74 may be configured with a pair of elongate arms 94, 96 that are spaced apart from each other when in an extended or locking position as illustrated in FIG. 6. The locking arms 94, 96 may be moved toward each other to flex or move at least a portion of the interlocking member 74 toward a retract or unlocking position as illustrated in FIG. 7.

A biasing member such as a spring may be provided that exerts a biasing force that may move the lever or push rod 72, button 68, and/or interlocking member 74 toward an initial or locked position. In at least one embodiment, the biasing member may exert force on and/or may be disposed on the interlocking member 74. For instance, the biasing member may exert force that forces top and bottom ends or end bars of the interlocking member 74 away from each other.

The interlocking member 74 may be configured to engage one or more features such as the notches 50, 51 and the front and back shells 44, 46.

The cam 88 is provided between the pair of elongate locking arms 94, 96. The elongate arms 94, 96 extend in a lateral direction and cooperate with the slots 90, 92 to each translate in an upright or downward direction for engaging the corresponding notches 50, 51 in the posts 48, 49. The lower locking arm 96 is generally longer than the upper locking arm 94 for engaging a pair of posts 48 in comparison to the single post 48 engaged by the upper locking arm 94. A pair of serpentine leaf springs 98 are provided on the traverse front shell 56 in engagement with each of the locking arms 94, 96 for biasing the locking arms 94, 96 into engagement with the corresponding notches 50, 51. The leaf springs 98 are in compression in the locked position of FIG. 6 and are further compressed in the locked position as illustrated in FIG. 7. The leaf springs 98 each include a larger lower serpentine region in comparison to the upper region to create identical force from the elongate arms 94, 96 on each notch 50, 51 of each post 48, 49. Of course, the invention contemplates any biasing member, and any leaf spring, which may be symmetrical or asymmetrical.

A tab 100, 102 extends from each locking arm 94, 96 and cooperates with the cam 88 as a follower for the cam 88. Additionally, a pair of cables 104, 106 are each mounted to the cam 88. Each of the cables 104, 106 extends about a cam surface 108, 110 of the cam 88. The cables 104, 106 extend about an arcuate surface 112, 114 of one of the tabs 100, 102. The cables 104, 106 are each fixed to the traverse front shell 56 by a corresponding pin 116, 118.

When the push button 68 is actuated linearly, for example six millimeters, the rotary actuator 80 is rotated sixteen degrees, also an example. Rotation of the rotary actuator 80 results in the rotation of the cam 88. The cam 88 acts as a pulley and rotation in the clockwise direction of FIG. 6 pulls the cables 104, 106 about the cam surfaces 108, 110 of the cam 88 thereby pulling the tabs 100, 102 towards the cam 88. The cam 88 includes a pair of flat surfaces 120, 122, which become horizontal when rotated as illustrated in FIG. 7 thereby providing clearance for the pair of locking arms 94, 96. As the tabs 100, 102 are translated towards the cam 88, the locking arms 94, 96 are also translated towards the cam 88 thereby disengaging from the notches 50, 51 of the posts 48, 49 thereby unlocking the positioning apparatus 42.

The notches 50, 51 are inclined or beveled to permit manual adjustment of the headrest 36 in the forward direction without pressing the push button 68. Therefore, a forward force on the headrest 36, forces the beveled surfaces of the notches 50, 51 against the locking arms 94, 96, thereby disengaging the locking arms 94, 96, and permitting manual adjustment of the headrest 36 in the forward direction.

Six millimeters of translation of the push button 68 according to one embodiment results in sixteen degrees of rotation of the rotary actuator 80 and consequently four millimeters of translation of each locking arm 94, 96. Thus linear motion is converted to rotary motion and then to linear motion thereby equally compressing the leaf springs 98 symmetrically. Once the push button 68 is depressed, the user can translate the headrest 36 and consequently the headrest front shell 44 and the rear shell 46 relative to the traverse member 52. Upon releasing the push button 68, the leaf springs 98 extend thereby forcing the elongate arms 94, 96 back into engagement with the notches 50, 51 of the posts 48, 49. As the elongate arms 94, 96 are extended, the cables 104, 106 are extended from the cam 88 thereby rotating the cam 88 and consequently the rotary actuator 80. As the rotary actuator 80 is rotated, the radially offset pin 82 engages the concave surface 86 of the push rod 72 thereby returning the push rod 72 and consequently the push button 68 to the locked position. Thus, the force of the leaf springs 98 may be employed for returning the push button 68 to the locked position. Therefore, the optional coil spring 78 beneath the push button 68 may be omitted. By utilizing rotation as the intermediate motion, counteracting forces may be minimized caused by surface friction of plastic materials.

Figure 8:
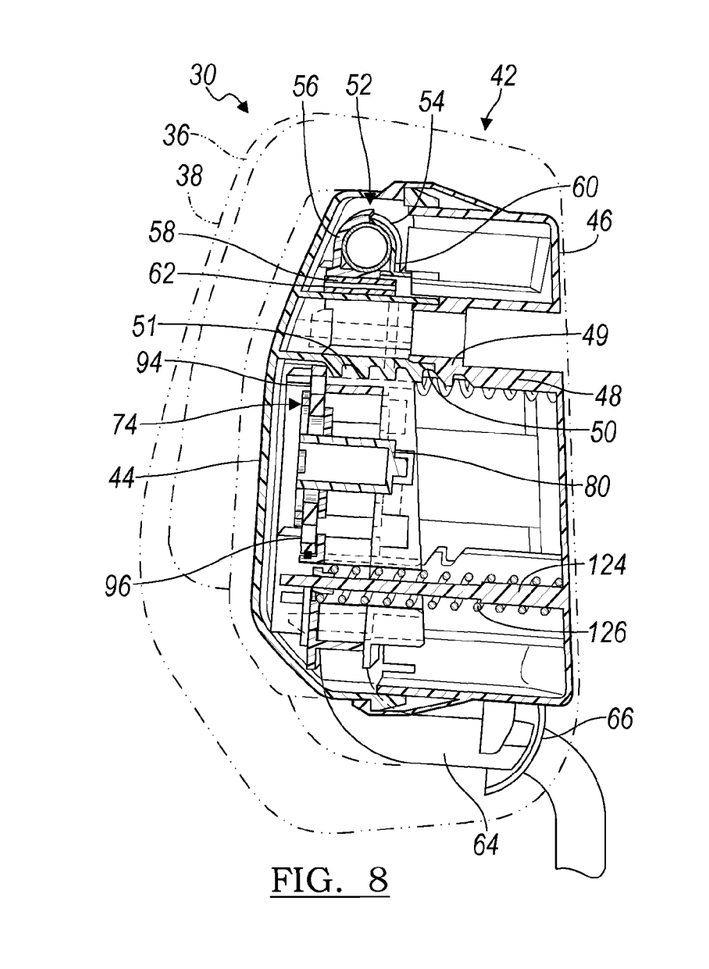
FIG. 8 is a center section view of the head restraint of FIG. 1.
Figure 9:
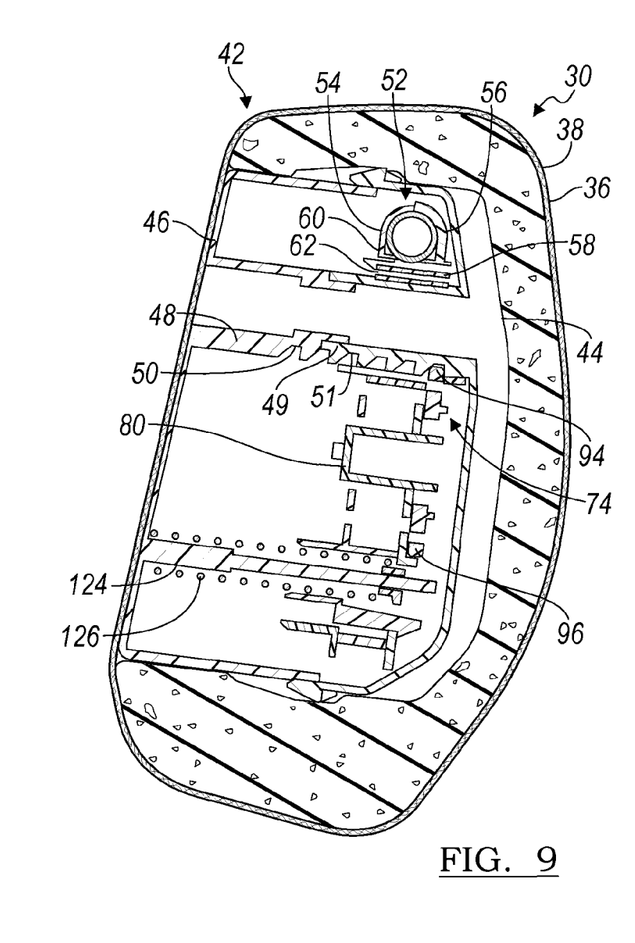
FIG. 9 is a center schematic view of the head restraint of FIG. 1.

FIGS. 8 and 9 illustrate the locking arms 94, 96 in engagement with the notches 51 in the posts 49 of the front shell 46. The posts 48, 49 of the front and rear shells 44, 46 are aligned so that the notches 50, 51 collectively provide a series of notches 50, 51.

Additionally, a plurality of bearing shafts 124 extend from the rear shell 46 through apertures through the traverse member 52. A coil compression spring 126 is provided on each bearing shaft 124 connected to the rear shell 46 and the traverse member 52. Thus, when the push button 68 is actuated to the unlocked position and the locking arms 94, 96 are retracted from the notches 50, the compression springs 126 return the headrest 36 to the fully rearward position illustrated in FIG. 3 for resetting the position of the head restraint 36. According to another embodiment, the springs 126 are tension springs 126 for extending the headrest 36 to the forward position of FIG. 1, if a forward position is desired as the reset position.

The bearing shafts 124 help keep the front and rear shells 44, 46 stable relative to the traverse member 52. Since forces for actuating the push button 68 and/or translating the headrest 36 are typically applied to one lateral side of the head restraint assembly 30, the bearing shafts prevent tilting or binding of the headrest 36 relative to the traverse member 52. Additionally, the bearing shafts prevent kinking or buckling of the springs 126. Even further, the bearing shafts 124 assist in alignment and assembly of the head restraint assembly 30, thereby eliminating additional tooling, such as an alignment jig. The bearing shafts 124 may have any suitable cross-sectional geometry, such as cylindrical, a pair of intersecting rectangles or a plus (+) shape, or the like.

Figure 10:
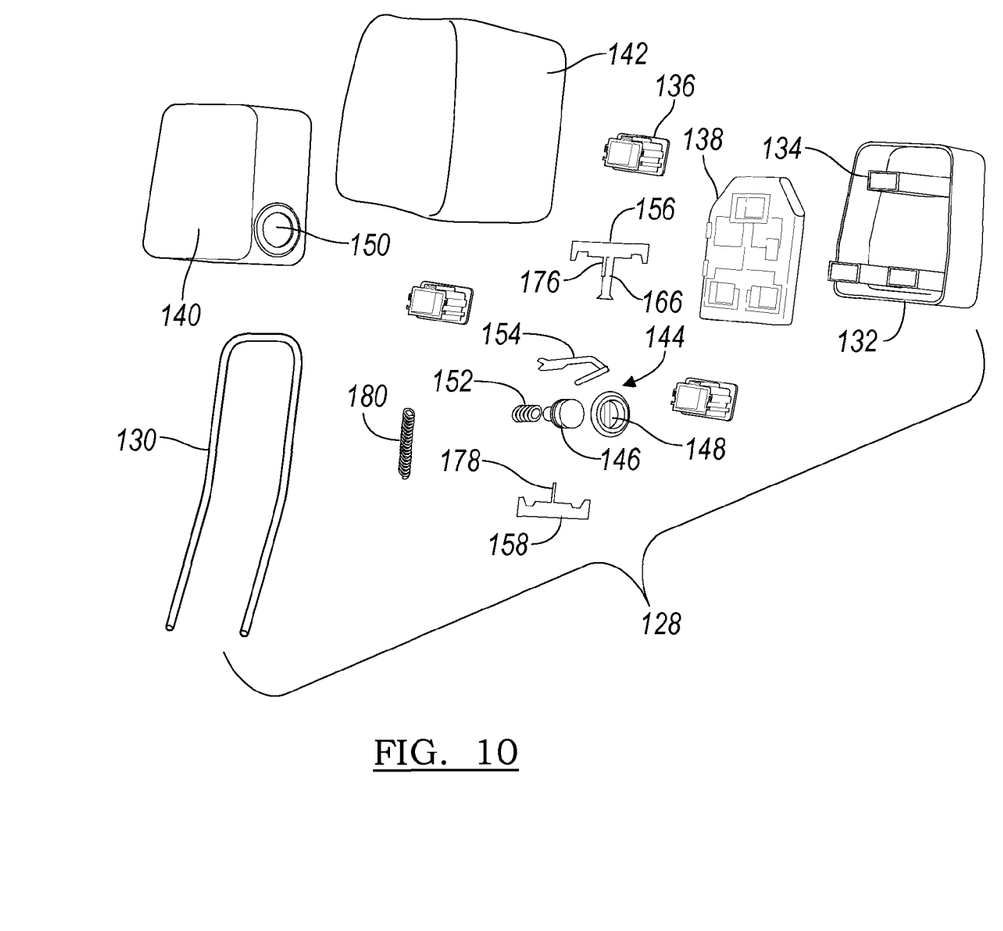
FIG. 10 is an exploded perspective view of the movable head restraint assembly of FIG. 1, according to another embodiment.

Referring now to FIG. 10, another head restraint assembly 128 is illustrated exploded in accordance with another embodiment for the head restraint assembly of FIG. 1; and which is similar to the prior embodiment except where noted. The head restraint assembly 128 includes a support post 130. A back shell 132 includes an array of posts 134 extending in a fore/aft direction. A series of sliders 136 are each provided on one of the posts 134 for movement in the fore/aft direction. A traverse member 138 is mounted to the sliders 136 for guiding the back shell 132 along the sliders 136. A front shell 140 has a corresponding array of posts 135 (FIGS. 13 and 14) which are mounted to the posts 134 of the rear shell 132. The front and rear shells 132, 140 support a trim cover and cushion assembly 142.

A positioning apparatus 144 includes a push button 146 mounted on a sleeve 148 through an aperture 150 in the front shell 140. The push button 146 may be biased to an unlock position by a spring 152. The push button 146 actuates a lever 154 which engages a pair of locking arms 156, 158 of an interlocking member 160.

Figure 11:
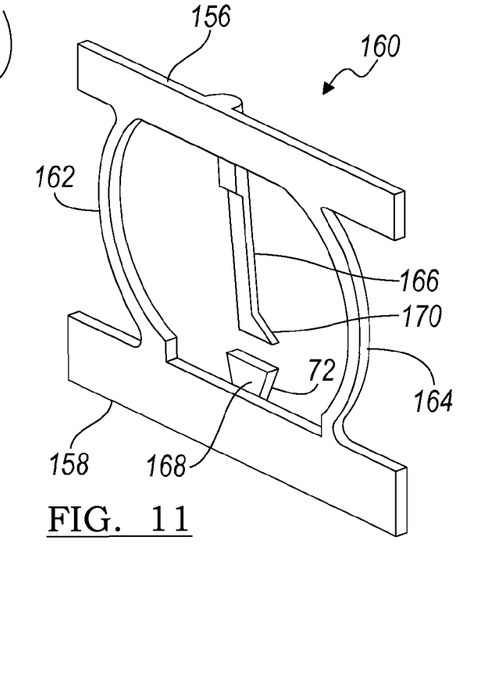
FIG. 11 is a perspective view of an interlocking member for the head restraint assembly of FIG. 10.
Figure 12:
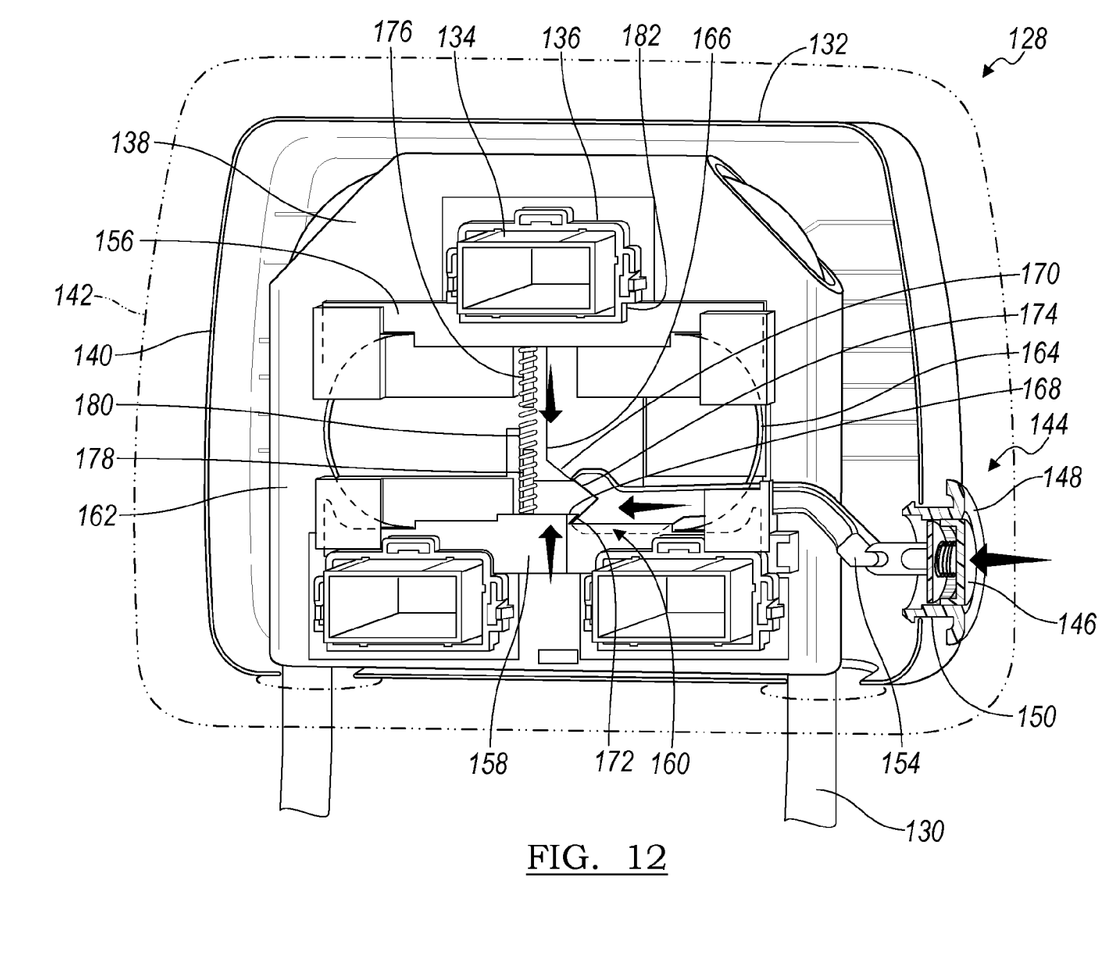
FIG. 12 is a fragmentary perspective view of the movable head restraint assembly of FIG. 10 in a locked condition.

The interlocking member 160 is illustrated enlarged in FIG. 11. The locking arms 156, 158 include a pair of leaf springs 162, 164 each provided proximate lateral ends thereof for uniform compression between the locking arms 156, 158. The interlocking member 160 also includes a pair of upright arms 166, 168 spanning a region between the elongate arms 156, 158 and extending centrally therefrom. Referring now to FIG. 12, each of the upright arms 166, 168 includes an inclined surface 170, 172 for engaging a corresponding inclined surface 174 on a concave surface 174 of the lever 154. Additionally, a pair of posts 176, 178 are each provided extending centrally from one of the locking arms 156, 158 for orienting and providing bearing support to a coil spring 176 provided between the elongate locking arms 156, 158.

The interlocking member 160 may be formed integrally or of various components. For example, the locking arms 156, 158, leaf springs 162, 164, upright arms 166, 168 and posts 176, 178 may be formed integrally of a flexible polymeric material. Alternatively, the interlocking member 160 may be formed of various components.

As illustrated in FIG. 12, linear actuation of the push button 146 results in linear actuation of the lever 154, which consequently results in equal linear retraction of the locking arms 156, 158 from corresponding notches 182 provided in the posts 134 of the back shell 132.

Figure 13:
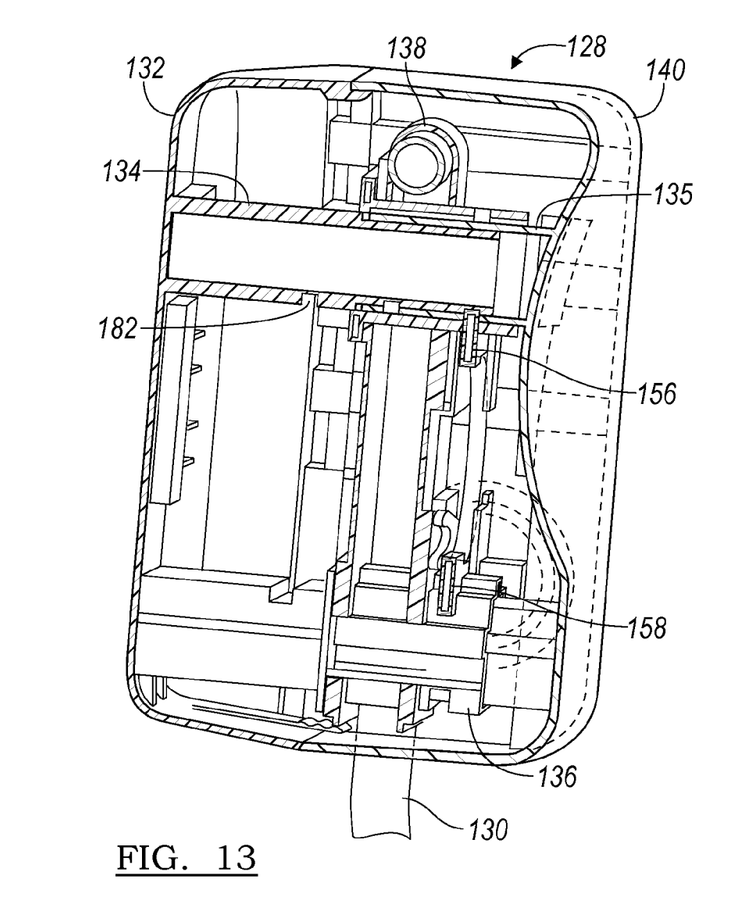
FIG. 13 is a center section view of the movable head restraint assembly of FIG. 10, illustrated in the locked condition.
Figure 14:
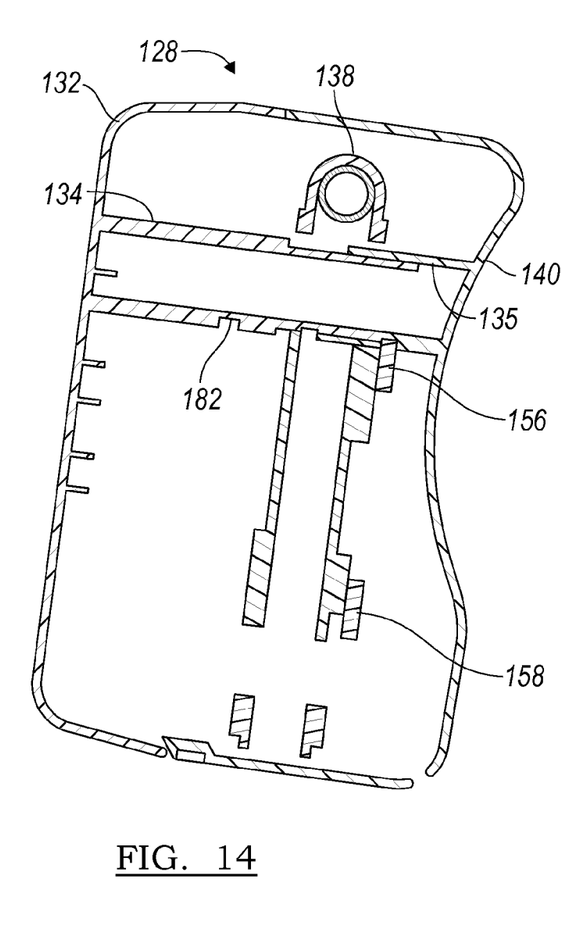
FIG. 14 is a center section view of the movable head restraint assembly of FIG. 10, illustrated in the locked condition.
Figure 15:
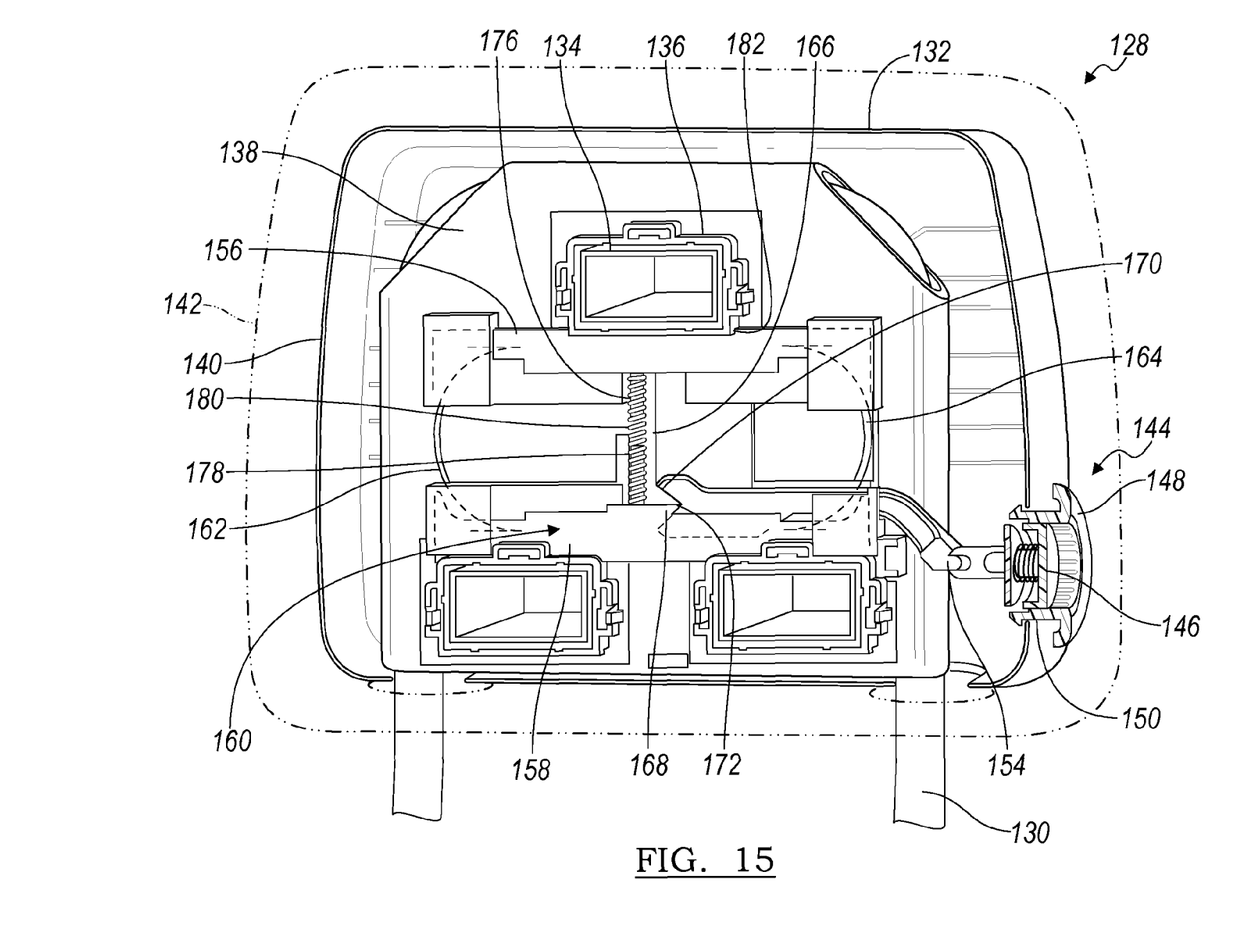
FIG. 15 is a fragmentary perspective view of the movable head restraint assembly of FIG. 10 in an unlocked condition.
Figure 16:
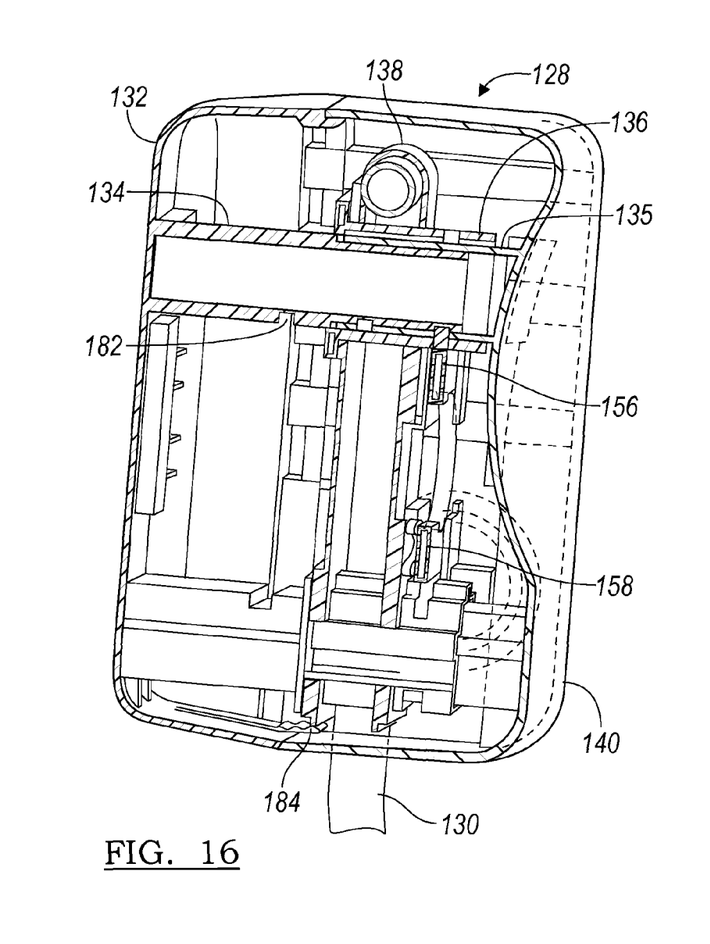
FIG. 16 is a center section view of the movable head restraint assembly of FIG. 10 in the unlocked condition.
Figure 17:
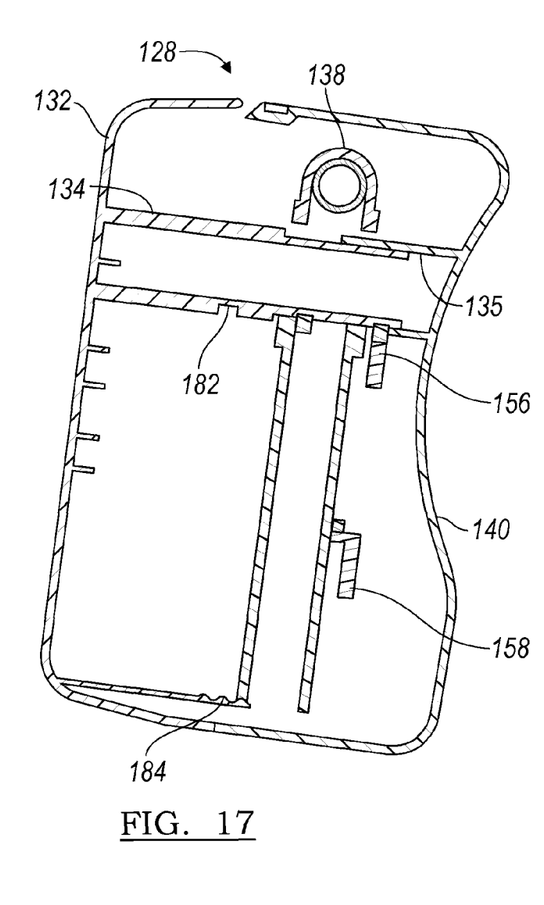
FIG. 17 is a center section view of the movable head restraint assembly of FIG. 10 in the unlocked condition.

FIGS. 13 and 14 illustrate the locking arms 156, 158 in engagement with notches 182 in the posts 134, 135. FIG. 15 illustrates the push button 146 and lever 154 actuated linearly inboard to the unlocked position whereby the locking arms 156, 158 are retracted from the notches 182. The concaved surface 174 of the lever 154 causes the upright arms 166, 168 to converge thereby retracting the locking arms 156, 158. FIGS. 16 and 17 also illustrate the unlocked positions of the locking arms 156, 158.

A friction feature may be provided with the rear shell 134 as illustrated in FIGS. 16 and 17. The friction feature may be configured to provide a desired amount of additional friction that may be overcome to permit movement of a headrest 128, which includes the front shell 140 and trim cover and cushion assembly 142, due to the movement of the traverse member 148 along the posts 134 of the back shell 132. The friction feature may facilitate engagement with another notch 184, which may be referred to as a soft notch. For instance, the friction feature may be provided on one of the posts 134 and may require a biasing force to overcome the compression provided by the springs 162, 164, 180. The friction feature may be contoured to receive the lower locking arm 158. The notch 184 may be contoured to permit advancement of the head restraint 36 by utilizing inclined or beveled surfaces between the notch 184. The notch 184 may be biased or raked in one direction so that the headrest 128 can be adjusted in one direction, such as a forward direction, without pressing the push button 146.

Figure 18:
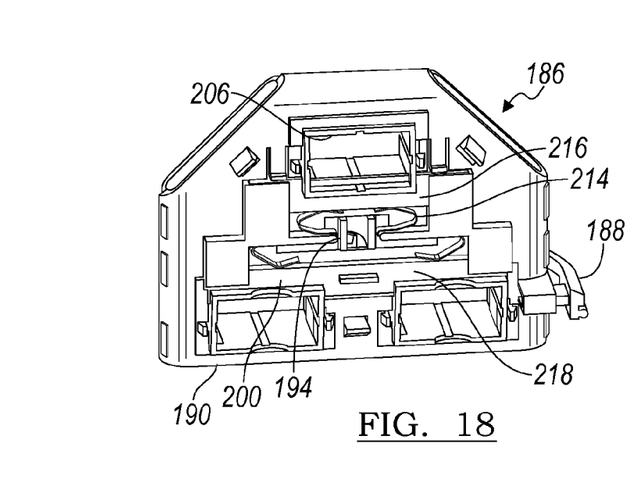
FIG. 18 is front perspective view of the movable head restraint assembly of FIG. 1 according to another embodiment, illustrated partially disassembled.
Figure 19:
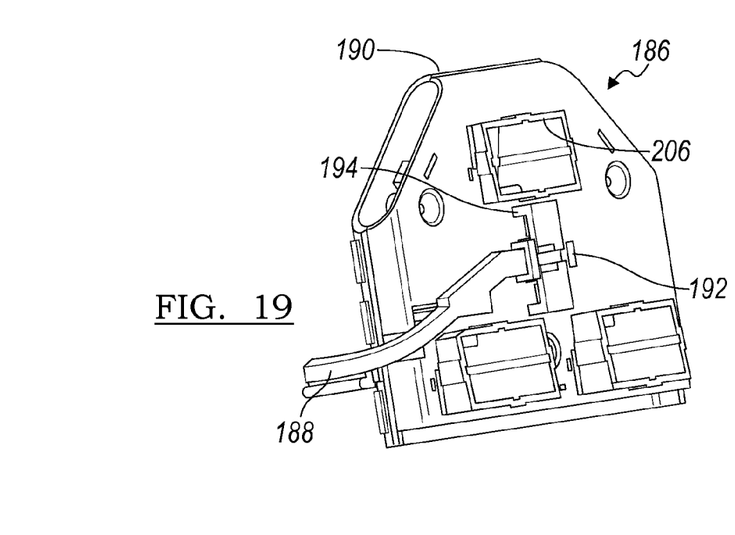
FIG. 19 is a rear perspective view of the movable head restraint assembly of FIG. 18.
Figure 20:
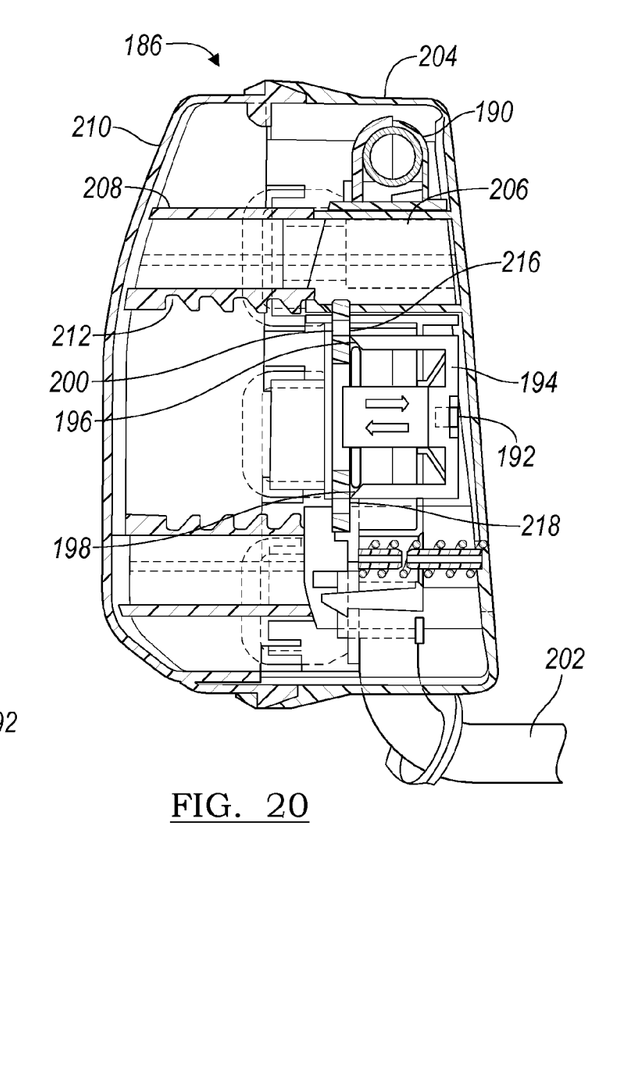
FIG. 20 is a center section view of the head restraint of FIG. 17.

FIGS. 18-20 illustrate a head restraint assembly 186 according to yet another embodiment. As illustrated in FIGS. 18 and 19, linear actuation of a push rod 188 relative to a traverse member 190 results in linear actuation of an output end 192 of the push rod 188. The output end 192 is inclined and engages a corresponding intermediate slide 194. The intermediate slide 194 cooperates with the traverse member 190 for linear travel in a fore and aft direction. Thus, linear actuation of the push rod 188 in an inboard lateral direction causes the intermediate slide 194 to travel in the fore direction.

Referring to FIG. 20, the intermediate slide 194 includes a pair of inclined surfaces 196, 198 that are each aligned with an interlocking member 200 so that when the intermediate slide 194 is actuated in the fore direction, the interlocking member 200 is retracted from the traverse member 190. The traverse member 190 is mounted to a support post 202, and a rear shell 204 is supported for translation on the traverse member 190. The traverse member 190 includes a series of sliders 206, which each receive a post 208 extending from a front shell 210 of the head restraint assembly 180 to the rear shell 204. A series of notches 212 are provided in each of the posts 208 such that retraction of the interlocking member 200 permits translation of the front and rear shells 204, 210 relative to the support posts 202.

For the head restraint assembly 186 of FIGS. 18-20, linear actuation of a push button (not shown) results in linear actuation of the push rod 188, consequently linear actuation of the intermediate slide 194 and linear actuation of the interlocking member 200. When a force is removed from the push button, springs 214 of the interlocking member 200 extend locking arms 216, 218 back into engagement with the notches 212. The translation of the locking arms 216, 218 forces the intermediate slide 194 in an aft direction which thereby extends the push rod 188 in a laterally outboard direction.

Figure 21:
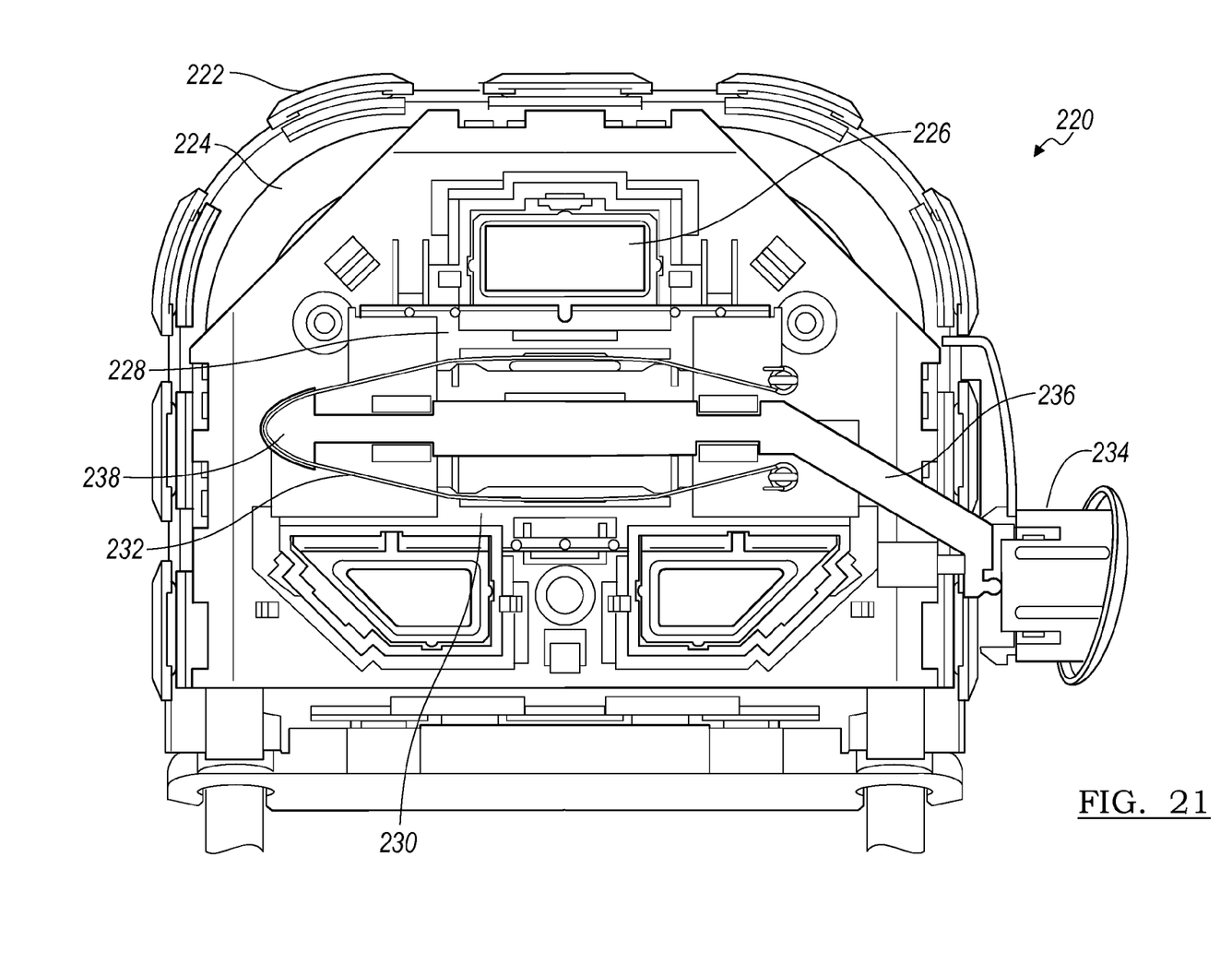
FIG. 21 is front elevation view of the movable head restraint assembly of FIG. 1 according to another embodiment, illustrated partially disassembled.

FIG. 21 illustrates another movable head restraint assembly 220 with a traverse member 222 on a support post 224. The traverse member 222 includes a series of guides 226 for receiving a plurality of posts of the associated headrest, which is removed from this figure, and which is similar to the prior embodiments. A pair of locking arms 228, 230 are mounted for translation on the traverse member 222 for engaging notches within the posts. A single leaf spring 232 is depicted in engagement with both locking arms 228, 230.

A push button (not shown) is mounted in a sleeve 234 on the headrest. The push button actuates a push rod 236. The push rod has a contoured end 238 that engages the leaf spring 232. The contoured end 238 is shaped to be homogenous with a contour of the leaf spring 232 to avoid crippling of the leaf spring 232. Translation of the push rod 236 inboard retracts the leaf spring 232 toward the push rod 236, thereby retracting the locking arms 228, 230 from the notches for permitting fore/aft adjustment of the associated headrest. Release of the push button causes the leaf spring 232 to extend to the position depicted thereby returning the locking arms 228, 230 into engagement with the notches. Return of the leaf spring also translates the push rod 236 to an outboard position, which in turn, returns the push button to the locked position.

In at least one or more embodiments, the head restraint may provide a reduced number of parts, faster assembly, smaller package space, and help meet regulatory requirements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed is:
1. A vehicle head restraint assembly comprising:
   a first guide member mounted proximate to a vehicle seat back;
   a second guide member mounted to the first guide member for movement in a fore and aft direction, wherein one of the first guide member and the second guide member has a series of notches formed therein spaced incrementally in the fore and aft direction;

a head restraint mounted to the second guide member;

a locking mechanism mounted to the other of the first guide member and the second guide member for extending into one of the series of notches for locking the second guide member at an incremental position relative to the first guide member, the locking mechanism further comprising a biasing member for biasing the locking mechanism into engagement with the series of notches; and an actuator mounted to one of the first guide member and the second guide member for actuation from one lateral side of the head restraint, the actuator cooperating with the locking mechanism such that linear actuation of the actuator from the one lateral side results in symmetrical compression of the biasing member to disengage the locking mechanism from the series of notches for permitting adjustment of the fore and aft position of the head restraint relative to the vehicle seat back.

2. The vehicle head restraint assembly of claim 1 wherein the series of notches are each inclined to permit the locking mechanism to be disengaged by a force applied upon the head restraint in the forward direction for adjustment in the forward direction without actuation of the actuator.

3. The vehicle head restraint assembly of claim 1 further comprising:
   a plurality of posts extending from one of the first guide member and the second guide member, the plurality of posts being received in the other of the first guide member and the second guide member; and
   a plurality of biasing members each oriented about one of the posts in engagement with the first guide member and the second guide member to bias the headrest to a reset position upon actuation of the actuator.

4. The vehicle head restraint assembly of claim 1 wherein the actuator further comprises a push rod for manual actuation from a locked position to an unlocked position, the actuator cooperating with the locking mechanism such that the biasing member of the locking mechanism returns the push rod to the locked position in an unloaded condition of the push rod.

5. The vehicle head restraint assembly of claim 1 wherein the actuator further comprises a push rod for manual actuation from a locked position to an unlocked position, the push rod having an inclined output end in engagement with the locking mechanism for actuating the locking mechanism in response to linear motion of the push rod.

6. The vehicle head restraint assembly of claim 5 wherein the locking mechanism is actuated by the push rod for linear motion for disengaging from series of notches.

7. The vehicle head restraint assembly of claim 6 wherein the locking mechanism further comprises:
   a locking arm for extending each locking member into the series of notches; and
   an intermediate slide in cooperation with the inclined output end of the push rod for translation in the fore and aft direction in response to actuation of the push rod, the intermediate slide having an inclined output end in cooperation with the locking arm for retracting the locking arm from the series of notches in response to actuation by the push rod.

8. The vehicle head restraint assembly of claim 1 wherein the actuator further comprises a push rod for manual actuation from a locked position to an unlocked position, the push rod having a concave output end in engagement with the locking mechanism for actuating the locking mechanism in response to linear motion of the push rod.

9. The vehicle head restraint assembly of claim 8 further comprising a rotary mechanism in cooperation with the locking mechanism, the rotary mechanism having a radially offset projection in engagement with the concave output end of the push rod so that translation of the push rod is converted to rotary motion of the rotary mechanism for disengaging the locking mechanism from the series of notches.

10. The vehicle head restraint assembly of claim 8 wherein the first guide member further comprises at least a pair of first guide members;
   wherein the second guide member further comprises at least a pair of second guide members, wherein one of the pair of first guide members and the pair of second guide members has a pair of a series of notches formed therein spaced incrementally in the fore and aft direction;
   wherein the locking mechanism further comprises a pair of locking members that are biased in opposed directions by the biasing member for extending each locking member into one of the pair of series of notches; and
   wherein the concave output end of the push rod engages a pair of inclined surfaces each provided on one of the pair of locking members such that translation of the push rod causes the pair of locking members to converge thereby disengaging from the pair of the series of notches.

11. The vehicle head restraint assembly of claim 10 wherein the pair of locking members are each generally elongate in a direction generally perpendicular to a direction of travel, and the pair of locking members each further comprise a post oriented centrally along the locking member and extending in the direction of travel toward the other locking member; and
   wherein the biasing member further comprises a pair of leaf springs each oriented between the pair of locking members, and a coil spring retained about the pair of posts.

12. The vehicle head restraint assembly of claim 1 wherein the biasing member comprises at least one leaf spring.

13. A vehicle head restraint assembly comprising:
   a first guide member mounted proximate to a vehicle seat back;
   a second guide member mounted to the first guide member for movement in a fore and aft direction, wherein one of the first guide member and the second guide member has a series of notches formed therein spaced incrementally in the fore and aft direction;
   a head restraint mounted to the second guide member;
   a locking mechanism mounted to the other of the first guide member and the second guide member for extending into one of the series of notches for locking the second guide member at an incremental position relative to the first guide member, the locking mechanism further comprising a biasing member for biasing the locking mechanism into engagement with the series of notches;
   a linear actuator mounted to one of the first guide member and the second guide member for actuation from a lateral side of the head restraint; and
   a rotary mechanism cooperating with the linear actuator and the locking mechanism such that linear actuation of the linear actuator rotates the rotary mechanism for compression of the biasing member to disengage the locking mechanism from the series of notches for permitting adjustment of the fore and aft position of the head restraint relative to the vehicle seat back.

14. The vehicle head restraint assembly of claim 13 wherein the rotary mechanism converts rotation to translation of the locking mechanism.

15. The vehicle head restraint assembly of claim 13 wherein the rotary mechanism further comprises:
- a pulley cooperating with the linear actuator; and
- a cable extending from the pulley, about a portion of the locking mechanism and fixed to one of the first guide member and the second member such that rotation of the pulley retracts the cable about the pulley, thereby actuating the locking mechanism.

16. The vehicle head restraint assembly of claim 13 wherein the rotary mechanism further comprises a cam in cooperation with the linear actuator and the locking mechanism such that rotation of the cam translates the locking mechanism.

17. The vehicle head restraint assembly of claim 16 wherein the rotary mechanism further comprises a cable extending from the cam, about a portion of the locking mechanism and fixed to the one of the first guide member and the second guide member such that rotation of the cam in an unlock direction retracts the cable about the cam, thereby disengaging the locking mechanism from the series of notches, and rotation of the cam in a lock direction translates the locking mechanism away from the cam and into engagement with the series of notches.

18. The vehicle head restraint assembly of claim 17 wherein the biasing of the locking mechanism into engagement with the series of notches by the biasing member consequently extends the cable from the cam thereby rotating the cam to the unlock direction.

19. The vehicle head restraint assembly of claim 13 wherein the first guide member further comprises at least a pair of first guide members;
wherein the second guide member further comprises at least a pair of second guide members, wherein one of the pair of first guide members and the pair of second guide members has a pair of a series of notches formed therein spaced incrementally in the fore and aft direction;
wherein the locking mechanism further comprises a pair of locking members that are biased in opposed directions by the biasing member for extending each locking member into one of the pair of series of notches, each of the pair of locking members having a tab oriented thereon; and
wherein the rotary mechanism further comprises:
- a cam in cooperation with the linear actuator, and
- a pair of cables each extending from the cam, about the tab of one of the pair of locking members and fixed to the one of the pair of first guide members and the pair of second guide members such that rotation of the cam in an unlock direction retracts the cables about the cam, thereby disengaging the pair of locking members from the corresponding pair of series of notches, and rotation of the cam in a lock direction translates the pair of locking members away from the cam and into engagement with the pair of the series of notches.

20. The vehicle head restraint assembly of claim 19 wherein the biasing member further comprises a pair of leaf springs each oriented between the pair of locking members for biasing the locking members into engagement with the corresponding series of notches which consequently extends the cables from the cam thereby rotating the cam to the unlock direction.

* * * * *